United States Patent [19]

Tucker et al.

[11] Patent Number: 5,656,315

[45] Date of Patent: Aug. 12, 1997

[54] METHOD FOR IMPREGNATING POROUS MATERIAL WITH LIQUID FLAVORING

[75] Inventors: David C. Tucker, Littleton, Colo.; John J. Fisher, Franklin Park; Kenneth A. Marchetti, Northlake, both of Ill.

[73] Assignee: Advanced Food Technologies, Inc., Englewood, Colo.

[21] Appl. No.: 322,875

[22] Filed: Oct. 13, 1994

[51] Int. Cl.$^6$ ..................................... A23L 1/22
[52] U.S. Cl. ........................ 426/420; 426/78; 426/293; 53/431
[58] Field of Search .................. 427/243, 244, 427/245; 118/690, 334; 426/420, 78, 302, 303, 293; 53/111 R, 111 RC, 431, 428

[56] References Cited

U.S. PATENT DOCUMENTS

| | | | |
|---|---|---|---|
| 4,017,002 | 4/1977 | Doyle et al. | 221/63 |
| 4,189,896 | 2/1980 | Kolbach et al. | 53/431 |
| 4,286,030 | 8/1981 | Moore | 429/253 |
| 4,559,157 | 12/1985 | Smith et al. | 252/90 |
| 4,904,524 | 2/1990 | Yoh | 428/311.3 |
| 4,975,292 | 12/1990 | Loizzi | 426/77 |

*Primary Examiner*—Lien Tran
*Attorney, Agent, or Firm*—McKinney, Stringer & Webster, P.C.

[57] ABSTRACT

A method for impregnating porous material with a liquid flavoring. The porous material comprises embossed sheets or disks of porous absorbent material, each of which is dispensed automatically onto a conveyor. Each individual disk is squirted automatically with a selected amount of liquid flavoring and then immediately packaged automatically. The selected amount of flavoring is less than the amount required to supersaturate the disk. Thus, by a passive capillary action, or "wicking" effect, dispersal of the flavoring liquid throughout the disk continues during the packaging step. This method reduces the amount of flavoring which is wasted in conventional impregnation methods. Further, the use of the capillary action to complete the saturation process allows the packaging to be commenced prior to completion of the saturation process and thereby substantially increases the speed with which the process can be completed.

21 Claims, 1 Drawing Sheet

METHOD FOR IMPREGNATING POROUS MATERIAL WITH LIQUID FLAVORING

FIELD OF THE INVENTION

The present invention generally relates to methods for impregnating porous materials with liquids and, more particularly, to impregnating porous sheets with a liquid flavoring agent.

SUMMARY OF THE INVENTION

The present invention is directed to a method for impregnating porous sheets with a liquid. In accordance with this method, there first is provided a supply of liquid in an automatic liquid applicator. A plurality of porous sheets also is provided in an automatic dispenser. The porous sheets are composed of porous, absorbent material. The porous sheets are dispensed automatically individually onto an application surface. While on the application surface, a selected amount of liquid from the liquid applicator is squirted automatically onto each of the porous sheets. The selected amount of liquid is less than the amount required to supersaturate the porous sheet. Each of the sheets is conveyed to an automatic packaging machine and then is packaged automatically individually.

Further, the present invention is directed to a method for impregnating porous sheets with liquid. First there is provided in an automatic dispenser a plurality of sheets composed of porous, absorbent material and a supply of liquid in an automatic liquid applicator. The porous sheets are dispensed automatically onto an application surface. Each of the porous sheets has a first side and a second side and an edge. The first side is embossed with an embossment pattern that is adapted to facilitate the separation of individual porous sheets during the dispensing step. Liquid is applied automatically to the porous sheets while on the application surface in a manner which permits the flavoring to be absorbed by the porous sheets. Finally, the flavor-impregnated porous sheets are conveyed to an automatic packaging machine and are packaged individually.

DETAILED DESCRIPTION OF THE PREFERRED EMBODIMENTS

Figure 1:
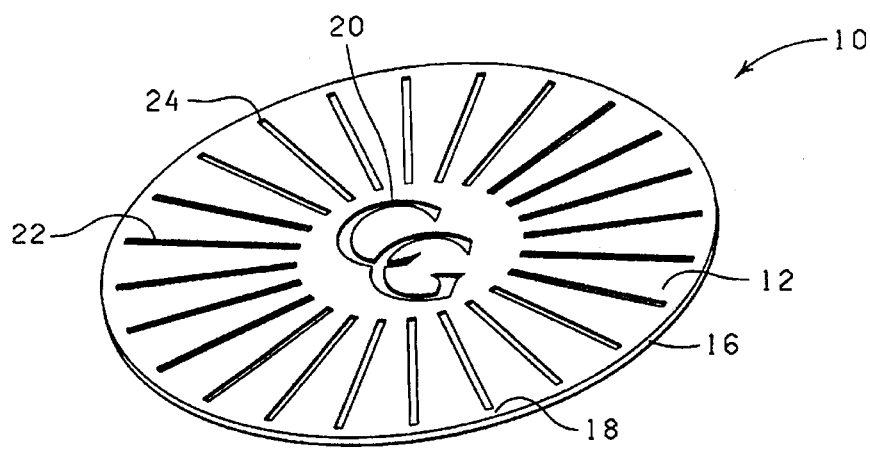
FIG. 1 is a perspective view of a liquid-impregnated porous sheet made in accordance with the present invention.
Figure 2:
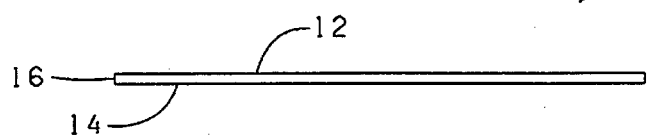
FIG. 2 is a side elevational view of the liquid-impregnated porous sheet shown in FIG. 1.

Flavored coffees are becoming increasingly popular, and a wide variety of flavored coffees now are available. These coffees usually are sold as whole beans which may be ground by the merchant at the time of purchase or by the individual consumer in a small household coffee grinder immediately before use. While these flavored coffee beans produce a delicious beverage, they are very expensive. Moreover, in order to maintain their freshness for prolonged periods of time, the coffee, whether ground or in whole beans, must be carefully sealed and kept under refrigeration.

The present invention is directed to a method for making beverage flavoring sheets comprising flavor-impregnated pieces of thin, porous, absorbent material which can be used to impart flavor to beverages which are percolated through the material. For example, such a flavoring sheet can be used to impart flavor to unflavored coffee as it is brewed. For this purpose, a disk shaped flavoring sheet can be placed in the bottom of the "cupcake" shaped brew baskets used in most conventional coffee makers. In this way, as the coffee flows through the flavoring disk, the flavor in the disk is imparted to the coffee. Of course, the configuration of the flavoring sheet can be varied to suit the shape of the brew basket or other mechanism used to contact the beverage with the flavoring sheet.

The method of the present invention reduces the expense and the time involved in mass production of flavoring sheets. The use of embossed porous sheets as the starting material improves the efficiency of the feeder equipment.

The use of a squirting technique, where only a predetermined amount of flavoring is applied to each sheet, reduces waste of flavoring. This is because the predetermined amount is selected to provide less than the amount required to supersaturate the disks.

Still further, the method of this invention employs capillary action to complete the dispersal of the liquid flavoring through the porous sheet. Thus, the automated packaging process may proceed immediately after application of the flavoring and before the flavoring has been dispersed completely through the sheet; the dispersal will continue during and after packaging. This significantly reduces the time required to complete the production and packaging processes.

As will become apparent, the method of this invention contemplates the use of an automated feeding and packaging system and is directed towards improving the speed and efficiency with which this automated process can be completed. Generally, the automated system comprises a feeder, a conveyor comprising an application surface, a liquid applicator and a packaging machine. The feeder receives and dispenses the individual porous sheets onto the application surface which preferably comprises the conveyor. The conveyor carries the sheets to the packaging machine. The liquid applicator applies the liquid flavoring to the sheets while on the application surface.

In accordance with the method of the present invention, a supply of suitable porous sheets first is provided. The porous sheets are formed of porous material. As used herein, "porous" denotes the quality of being permeable to liquids. This is necessary as the intended use of the liquid-impregnated porous sheets made in accordance with the present invention is to flavor coffee or other beverages. Thus, the porous sheet must permit percolation or permeation of the beverage to be flavored through the flavoring sheet.

The porous material should also be absorbent. As used herein, "absorbent" denotes the quality of being able to take in and retain liquid. More particularly, the porous material should be capable of absorbing and retaining a liquid, such as liquid flavoring, as well as releasing the liquid when contacted with a beverage.

Also, for reasons which will become apparent, the porous material should be formable into thin sheets or disks. In most instances the porous material will be cellulosic. For example, paper used to make laboratory filters is suitable. Even more preferably, the porous material comprises a major portion of cotton fiber. As used herein, a major portion refers to at least 50 percent. In the preferred practice of this invention, the porous material is about 75 percent cotton, the remainder being non-cotton cellulosic fibers.

The use of cotton fiber as a major component of the porous material is advantageous as it is dioxin free. This eliminates the hazards of the dioxins present in filters composed mainly of cellulose. Moreover, a porous material comprising a major portion of cotton is more absorbent. This provides more rapid dispersal of the liquid flavoring upon application. Moreover, it is believed that the cotton material provides a better end product; a flavor-impregnated disk comprising a major portion of cotton provides a prolonged release of liquid flavoring when contacted with brewing coffee.

Finally, where the liquid-impregnated porous material is used in connection with human consumables, as in the preferred practice of the present invention, it is necessary that the porous material be of a type which will be approvable by the United States Food and Drug Administration.

A preferred porous material is a grade 108084 paper, manufactured by the Custom Papers Group (Rochester, Mich.), which comprises by weight about 75 percent cotton and about 25 percent non-cotton cellulosic fiber.

Having selected the porous material, the porous material is formed into porous sheets, that is, thin, flat separate pieces of porous material. These sheets should be calendared to provide a smooth surface. The porous sheets may take various forms. As indicated, a small disk shape is one preferred configuration as this is receivable in the brew basket of most conventional coffee makers. Such a disk may be about 3.5 inches in diameter and approximately 0.021 inch in thickness.

A preferred porous sheet is shown in FIGS. 1–4, to which attention now is directed. The porous sheet, designated generally by the reference numeral 10 is disk-shaped, having a front side 12 and a back side 14 with a peripheral edge 16 and an edge portion 18 adjacent thereto.

Figure 3:
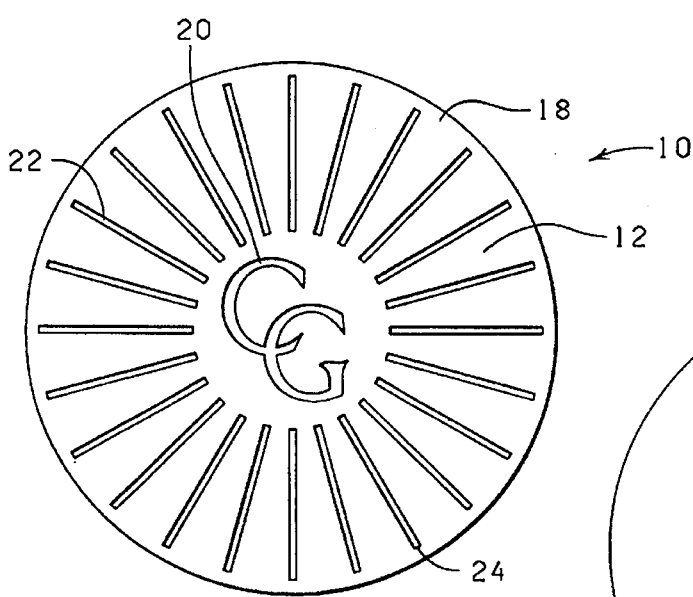
FIG. 3 is a plan view of the front side of the liquid-impregnated porous sheet shown in FIG. 1.
Figure 4:
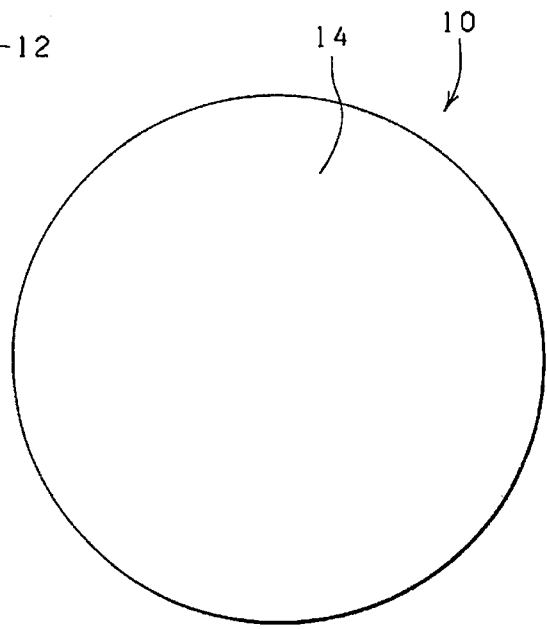
FIG. 4 is a plan view of the back side of the liquid-impregnated porous sheet shown in FIG. 1.

As illustrated in FIGS. 1 and 3, the front surface 12 of the porous sheet 10 is embossed. As used herein, the term "embossed" denotes generally the formation of depressions or indentations in the surface of the porous sheets. Although the number, configuration and position of the elements of the embossment pattern may vary, one preferred embossment pattern for the disk-shaped porous sheet 10 includes indicia, such as a logo 20, in the center of the front 12 and a plurality of striations 22 extending radially from near the center of the disk 10. The striations are spaced equal distances from each other, and the ends 24 of the striations approach but do not reach the edge 16. Of course, the embossment may include the application of a brand name or other indicia in addition to or in lieu of the logo 20 for purposes of ornamentation, advertising or identification.

The embossing may be accomplished simultaneously with the die cutting of the porous material into sheets. For example, using a suitable die in a punch press, disks of the desired configuration are automatically and uniformly cut and embossed. However, other cutting and embossing techniques which produce embossed porous sheets having the desired characteristics are considered to be within the scope of this invention.

A plurality of porous sheets are loaded into a suitable dispensing mechanism, such as a belt-fed dispenser. Most preferably, the dispenser is a pneumatic coupon feeder which separates and ejects the porous sheets by means of an air jet mechanism. The air jet mechanism blows air between the porous sheets to separate the sheets. Embossment of the porous sheets, as described hereinabove, facilitates the separation and feeding of the porous sheets by the air jet mechanism.

The dispenser places the porous sheets automatically and individually onto an application surface for application of the liquid. Preferably, the application surface comprises a conveyor which will carry the porous sheets to the packaging machine yet to be described. A preferred conveyor is a lugged, infeed chain conveyor.

Having loaded the dispenser with a plurality of porous sheets, a liquid next is provided. The liquid must be of a viscosity which permits it to be applied by squirting. Further, the liquid must have a volatility which allows most or all of the liquid to be absorbed consistently into the porous material upon application. Use of highly volatile liquids which evaporate rapidly may result in inadequate impregnation.

For purposes of this invention, the liquid preferably is a liquid flavoring agent. The word "flavor" denotes the simultaneous physiological and psychological response obtained from a substance in the human mouth that includes the senses of taste, smell and feel. Taste, as distinguished from flavor, is that special sense that perceives and distinguishes the sweet, sour, bitter, or salty quality of a dissolved substance in the mouth and is mediated by taste buds on the tongue. Accordingly, as used herein the term "flavoring" denotes a substance capable of imparting a different or additional aroma to a beverage, or of altering the aroma of a beverage. A flavoring in accordance with this invention may or may not add or alter the taste or feel of the beverage.

Where the liquid-impregnated porous sheet to be made by the present invention is to be used to flavor a water-based beverage such as coffee, the liquid flavoring preferably will comprise a water soluble liquid flavoring preparation. Extracts from natural sources are particularly desirable. Powdered flavorings are satisfactory if reconstituted into liquid form.

The liquid flavoring will comprise at least one flavor constituent, such as amaretto, and at least one solvent. As most flavoring constituents actually comprise a plurality of constituents with different molecular weights, it is preferable to include a plurality of solvents with different flash points. This, in combination with extended release properties of a predominantly cotton porous sheet as a carrier for the flavoring, provides a complex, intense and extended flavor profile to the beverage being flavored.

Particularly preferred flavoring extracts are those marketed by Quest International (Owen Mills, Md.). These flavoring extracts each comprise about 0.5 parts (by volume) flavor, such as amaretto, about 90 parts propylene glycol, about 1 part alcohol (ethanol), and about 8.5 parts water. This flavoring then has three solvents—water, ethanol and propylene glycol—each with a different flash point. Thus, the flavoring agent will be effectively released during the beverage flavoring process.

In some instances, it may be desirable to add an ingestible coloring agent, such as liquid food coloring, to the flavoring preparation, to result in coloration of the porous material when impregnated with the flavoring. This will give the flavor disks a more appealing appearance, and will provide a means by which materials impregnated with different flavors may be visually distinguished.

The selected liquid is loaded into a liquid applicator, such as a piston filler. The piston filler is set to squirt each porous sheet on the application surface. More preferably, the piston filler is arranged to squirt each porous sheet as it passes thereunder on the conveyor. The piston filler should be of a type which provides high accuracy so that the amount applied to each porous sheet can be controlled with precision. As used herein, "squirt" denotes a small discrete stream of fluid aimed directly at the porous sheet so that substantially all the liquid contacts and is absorbed by the porous sheet.

The amount of liquid to be applied to each porous sheet will vary depending on the absorbent capacity of the porous sheet and on the intended use of the liquid-impregnated porous sheet. For example, where the liquid-impregnated porous sheet comprises a flavor-impregnated sheet, the particular flavoring characteristics of the flavoring agent should be considered, as well as the volume of beverage to be flavored and the aroma to be imparted to the beverage.

In any event, the selected amount of the flavoring should be less than the amount of fluid required to supersaturate the porous sheet. This will ensure efficient usage of the flavoring. For example, for the 3.5 cotton disk described hereinabove, and when using the above described Quest brand flavoring, a preferred amount of liquid is from about 1.8 to about 2.0 grams, as the saturation capacity of the disk is about 2.5 grams.

The conveyor carries the porous sheets directly to a conventional horizontal wrapper machine where the porous sheets are packaged immediately after application of the liquid. There is no need to allow the impregnated porous sheets to dry, nor is there any need to press out excess liquid. The dispersion of the liquid will be completed by a natural, passive capillary action or "wicking" effect, and this will occur during the packaging step and possibly for moments after the packaging is completed.

Thus, in accordance with the method of the present invention, individually packaged liquid-impregnated sheets comprising sheets of porous material impregnated with liquid are rapidly and efficiently manufactured.

To flavor coffee as it is brewed in a coffee maker, a flavoring sheet is placed in the brew basket. Next, the coffee filter is placed in the brew basket and a measured amount of coffee is placed in the filter. Then, the brewing process is commenced and completed in the conventional manner. It will be appreciated that more than one flavoring sheet may be used simultaneously to impart more than one flavor to the coffee. Furthermore, in some instances, the porous material may be used as both a flavoring agent and as the filter for retaining the coffee grounds.

Changes may be made in the combination and arrangement of parts, elements, steps and procedures described herein without departing from the spirit and scope of the invention as defined in the following claims.

What is claimed is:

1. A method for impregnating porous sheets with liquid flavoring, comprising:
   providing a plurality of porous sheets composed of porous, absorbent material in an automatic dispenser;
   providing a supply of liquid flavoring in an automatic liquid applicator;
   automatically dispensing the porous sheets from the automatic dispenser individually onto an application surface;
   automatically squirting each of the porous sheets on the application surface with a selected amount of the liquid flavoring from the automatic liquid applicator, the selected amount of liquid flavoring being less than the amount of liquid flavoring required to supersaturate the porous sheets;
   conveying the porous sheets from the dispenser to an automatic packaging machine; and
   automatically packaging each of the porous sheets after squirting the porous sheet with the liquid flavoring.

2. The method of claim 1 wherein the porous sheets are disks.

3. The method of claim 2 wherein each of the disks is embossed in an embossment pattern adapted to facilitate the separation of the porous sheets during the dispensing step.

4. The method of claim 3 wherein only one side of the disk is embossed.

5. The method of claim 4 wherein the embossment pattern comprises a plurality of striations extending radially from near the center of the disk and wherein the striations approach but do not reach the edge of the disk.

6. The method of claim 5 wherein the embossment pattern includes indicia.

7. The method of claim 1 wherein the porous sheets are formed of a material comprising a major portion of cotton.

8. The method of claim 7 wherein the porous sheets are disks.

9. The method of claim 8 wherein each of the disks is embossed in an embossment pattern adapted to facilitate the separation of the disks during the dispensing step.

10. The method of claim 9 wherein only one side of each of the disks is embossed.

11. The method of claim 10 wherein the embossment pattern comprises a plurality of striations extending radially from the center of the disk and wherein the striations approach but do not reach the edge of the disk.

12. The method of claim 11 wherein the embossment pattern includes indicia.

13. The method of claim 7 wherein the porous sheets are comprised of about 75 percent cotton.

14. The method of claim 1 wherein the application surface is comprised in a conveyor which conveys the porous sheets from the dispenser to the automatic packaging machine.

15. The method of claim 1 wherein the liquid flavoring comprises a plurality of solvents having different flash points.

16. A method for impregnating porous sheets with liquid flavoring, comprising:
   providing a plurality of sheets composed of porous, absorbent material in an automatic dispenser;
   providing a supply of liquid flavoring in an automatic liquid applicator;
   automatically dispensing the porous sheets individually onto an application surface;
   wherein each of the porous sheets has a first side and a second side and an edge, and the first side is embossed with an embossment pattern that is adapted to facilitate the separation of individual porous sheets by the dispenser;
   automatically applying the liquid flavoring from the automatic liquid applicator to each of the porous sheets on the application surface in a manner which permits the liquid to be absorbed by the porous sheet;
   conveying the liquid flavoring-impregnated porous sheets to an automatic packaging machine; and
   automatically packaging each of the liquid flavoring-impregnated porous sheets individually.

17. The method of claim 16 wherein each of the porous sheets is a disk.

18. The method of claim 17 wherein the embossment pattern comprises a plurality of striations extending radially from near the center of the disk and which striations approach but do not reach the edge of the disk.

19. The method of claim 18 wherein the embossment pattern includes indicia.

20. The method of claim 16 wherein the application surface is comprised in a conveyor which conveys the porous sheets from the dispenser to the automatic packaging machine.

21. The method of claim 16 wherein the liquid flavoring comprises a plurality of solvents having different flash points.

* * * * *